(12) United States Patent
Takeda et al.

(10) Patent No.: US 7,175,785 B2
(45) Date of Patent: Feb. 13, 2007

(54) METHOD OF PRODUCING A POLARIZED LENS AND A CASTING DIE USED IN THE SAME

(76) Inventors: Yukio Takeda, Room B-203 Plador Suwa, 18-2-3, Tadasu-cho, Sabae-shi, Fukui 916-0004 (JP); Teruo Mikami, No. 5-4-1, Maruyamacho 1-chome, Sabae-shi, Fukui 916-0019 (JP)

( * ) Notice: Subject to any disclaimer, the term of this patent is extended or adjusted under 35 U.S.C. 154(b) by 422 days.

(21) Appl. No.: 10/478,107

(22) PCT Filed: Oct. 2, 2003

(86) PCT No.: PCT/JP03/12688

§ 371 (c)(1),
(2), (4) Date: Nov. 19, 2003

(87) PCT Pub. No.: WO2004/096529

PCT Pub. Date: Nov. 11, 2004

(65) Prior Publication Data

US 2004/0217495 A1    Nov. 4, 2004

(30) Foreign Application Priority Data

Apr. 28, 2003    (JP) ............................. 2003-123775

(51) Int. Cl.
  B29D 11/00    (2006.01)

(52) U.S. Cl. ....................... 264/1.32; 264/1.7; 264/2.5; 427/163.1

(58) Field of Classification Search ................. 264/1.1, 264/1.32, 1.7, 25; 425/808, 175; 427/162, 427/163.1
See application file for complete search history.

(56) References Cited

U.S. PATENT DOCUMENTS

| 5,800,744 A | * | 9/1998 | Munakata | .................... 264/1.7 |
| 6,165,392 A | * | 12/2000 | Kobuchi et al. | ............. 264/1.7 |
| 6,220,703 B1 | | 4/2001 | Evans et al. | |
| 6,638,450 B2 | * | 10/2003 | Richard | ..................... 264/1.32 |

FOREIGN PATENT DOCUMENTS

| DE | 904 345 C | 2/1954 |
| EP | 0 552 498 A1 | 7/1993 |
| JP | 2001-350122 | 12/2001 |

* cited by examiner

*Primary Examiner*—Mathieu D. Vargot
(74) *Attorney, Agent, or Firm*—Snider & Associates; Ronald R. Snider

(57) ABSTRACT

A method of producing a polarized lens and a casting die used therein are provided to allow a polarized film to be securely positioned within a casting die and a polarized lens to be cast in a uniform density and be almost free from any distortion on the surface so as to secure the stable uniformity of a lens as produced, which method comprises the steps of hot-pressing a polarized film 2 that is formed into a shape substantially corresponding to one of mobile portions 12 into a curved shape adaptable into a curvature of the lens; descending one of mobile portions 12 so as to generate a recess H thereat; mounting the polarized film 2 as shaped with the curvature into the recess H and closing a casting die 1; injecting a fused lens molding resin M into a cavity within the casting die 1 from a gate 13 with the lens molding resin M filled in a runner 13a engaged to the casting die 1; and taking out a prototype lens Lb in which the lens molding resin M is integrally jointed with the polarized film 2 when the molding resin M is cured.

29 Claims, 7 Drawing Sheets

METHOD OF PRODUCING A POLARIZED LENS AND A CASTING DIE USED IN THE SAME

TECHNICAL FIELD

The present invention relates to the improvement of a production method for a polarized lens that is used for blocking the ultraviolet rays and subduing the glare of the sunshine, in more details, pertaining to a method of producing a polarized lens and a casting die used in the same method, which allows a polarized film to be disposed in a casting die with the same film lens positioned in a secure manner therein and to make a molded lens consistent in density and almost free from distortion on the surface so as to secure the stable uniformity of a lens as produced.

BACKGROUND ART

As known, a polarized lens is widely adopted for sunglasses, goggles and so forth, which lens is conventionally sandwiched between two pieces of lenses (refer to page 3 through 5 and FIG. 1 through FIG. 3 of Japanese Patent Application Laid-open No.7-350122).

Also, nowadays, in light of the streamlining of the spectacles' structure and safety in case of the lens being broken during use, the mainstream structure of which is arranged by integrally laying a polarized lens over a plastic lens.

Such plastic polarized lens as mentioned above is produced by disposing a polarized film on a molding surface of a casting die and injecting a fused casting resin into such die so as to mold the same polarized lens. However, this production method is encountered with problems wherein a polarized film experiencing a high-temperature thermal history from a fused molding resin is distorted and the fluid resistance of the fused resin during injection shifts the polarized film within the casting die so as to make it difficult to stabilize the direction of a polarized axis to a given position.

Further, in case of injection molding of plastic resin material, the imbalance of the internal pressure of the casting die and the curing speed of the casting resin locally cause inconsistency in density and distortion to a molded product, which is likely to bring about defects in optical anisotropy and so forth.

In view of the inconveniences encountered with the prior art as mentioned above, the present invention is to provide a method of producing a polarized lens which allows a polarized film to be securely positioned within a casting die and a polarized lens to be cast in a uniform density and be almost free from any distortion on the surface so as to secure the stable uniformity of a lens as produced and a casting die used in the same method.

DISCLOSURE OF THE INVENTION

The means adopted for solving the above issues are described below.

That is to say, the present invention realizes a method of producing a polarized lens by using a split casting die 1 arranged such that at least one of a plurality of mobile portions 12 splitting a molding surface 10 that forms a curvature of the lens, into which surface a polarized film 2 is mounted, makes one of ascending and descending movement from the molding surface 10 so as to generate a recess H at the molding surface 10, which method comprises the steps of hot-pressing a polarized film 2, which is formed into a shape substantially corresponding to one of the plurality of mobile portions 12, into a curved shape adaptable into the curvature; descending the one of the plurality of mobile portions 12 so as to generate the recess H thereat; mounting the polarized film 2 as shaped with the curvature into the recess H and closing the casting die 1; injecting a fused lens molding resin M into a cavity within the casting die 1 from a gate 13 with the lens molding resin M filled in a runner 13a engaged to the casting die 1; and taking out a prototype lens Lb, in which the lens molding resin M is integrally jointed with the polarized film 2, when the molding resin M is cured.

Further, where appropriate, a method of producing a polarized lens according to the present invention comprises the step of applying a transparent adhesive on the polarized film 2 as mounted into the recess H.

Further, where appropriate, a method of producing a polarized lens according to the present invention comprises the steps of linearly forming a boundary between the mobile portions 12 of the casting die 1 so as to define the recess H at the molding surface 10 and holding a fringe portion of the polarized film 2 on to a stepped portion generated along the boundary.

Further, where appropriate, a method of producing a polarized lens according to the present invention comprises the step of performing a hard coating operation on a surface of the lens prototype Lb.

Further, where appropriate, a method of producing a polarized lens according to the present invention comprises the steps of screwing an adjusting bolt 14 into the respective mobile portions 12 from a bottom surface of the casting die 1 and turning the bolt 14 so as to make one of ascending and descending movement of the respective mobile portions 12 and make a depth of the recess H adjustable.

Further, where appropriate, a method of producing a polarized lens according to the present invention comprises the step of mixing the lens molding resin M with a photochromic material so as to be provided with photochromism functionality.

Further, preferably, a method of producing a polarized lens according to the present invention comprises the step of differentiating a first direction to which the fused lens molding resin M is filled in the runner 13a engaged to the casting die 1 from a second direction to which the lens molding resin M is injected into the cavity within the casting die 1 through the gate 13 so as to abate an injection pressure of the lens molding resin M into the cavity.

Further, where appropriate, a method of producing a polarized lens according to the present invention comprises the step of making a thickness of a polarized film original sheet 20 in the order of 0.2 mm.

Further, the present invention realizes a casting die used in the method of producing a polarized lens as mentioned above wherein a plurality of mobile portions 12.12 . . . are telescopically received in a casing 11 and a gate 13 is formed at an upper fringe portion of the casing 11, through which gate a fused lens molding rein M is injected into a cavity of the die and upper surfaces of the respective mobile portions 12.12 . . . are engaged in alignment so as to form a molding surface 10 with a curvature and one of ascending and descending operation is performed on at least one of the mobile portions 12 so as to generate a stepped portion at a boundary between said adjacent mobile portions 12 and a recess H is generated at the molding surface 10, into which recess a polarized film 2 is inserted.

Further, preferably, a casting die used in the method of producing a polarized lens according to the present invention is arranged such that an adjusting bolt 14 is screwed into each of the plurality of mobile portions 12 from a bottom side of the casting die and the adjusting bolt 14 is turned so as to perform one of ascending and descending operation on at least one of the mobile portions 12 and adjust a depth of the recess H.

BRIEF DESCRIPION OF THE DRAWINGS

BEST MODE FOR CARRYING OUT THE INVENTION

Hereinafter, the preferred embodiments of the present invention are described in more details with reference to the accompanying drawings.

(First Embodiment)

Figure 1:
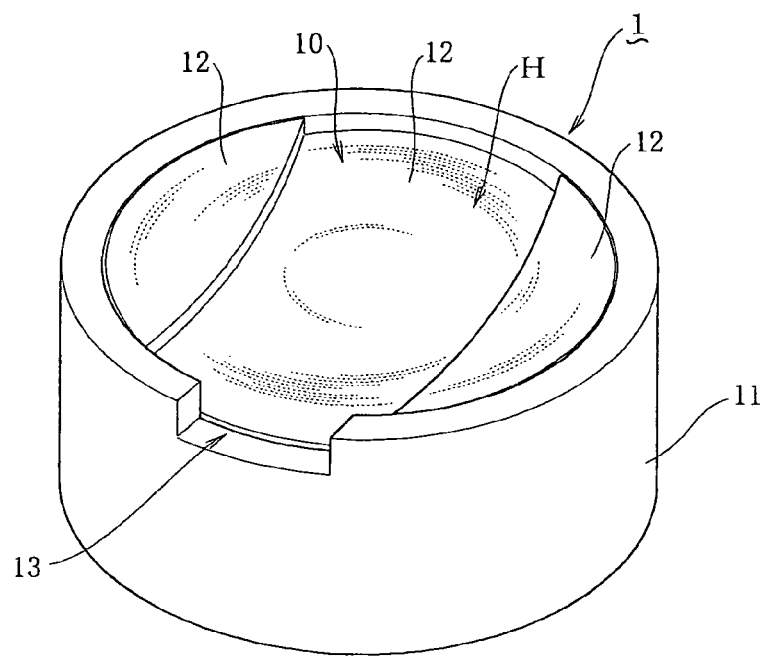
FIG. 1 is a perspective view of a split casting die adopted for the first embodiment.
Figure 2:
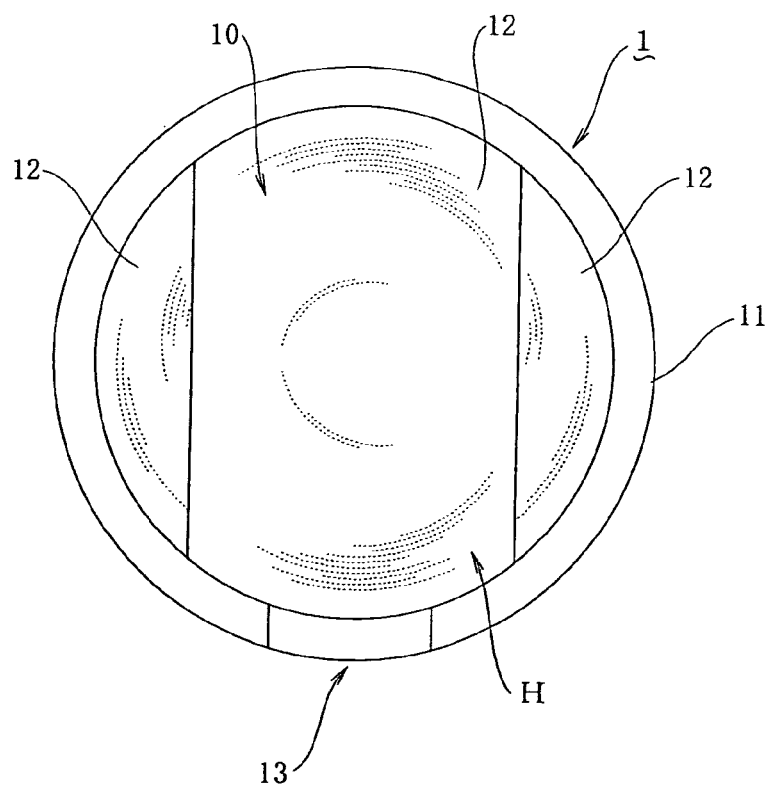
FIG. 2 is an upper surface view of the split casting die adopted for the first embodiment.
Figure 3:
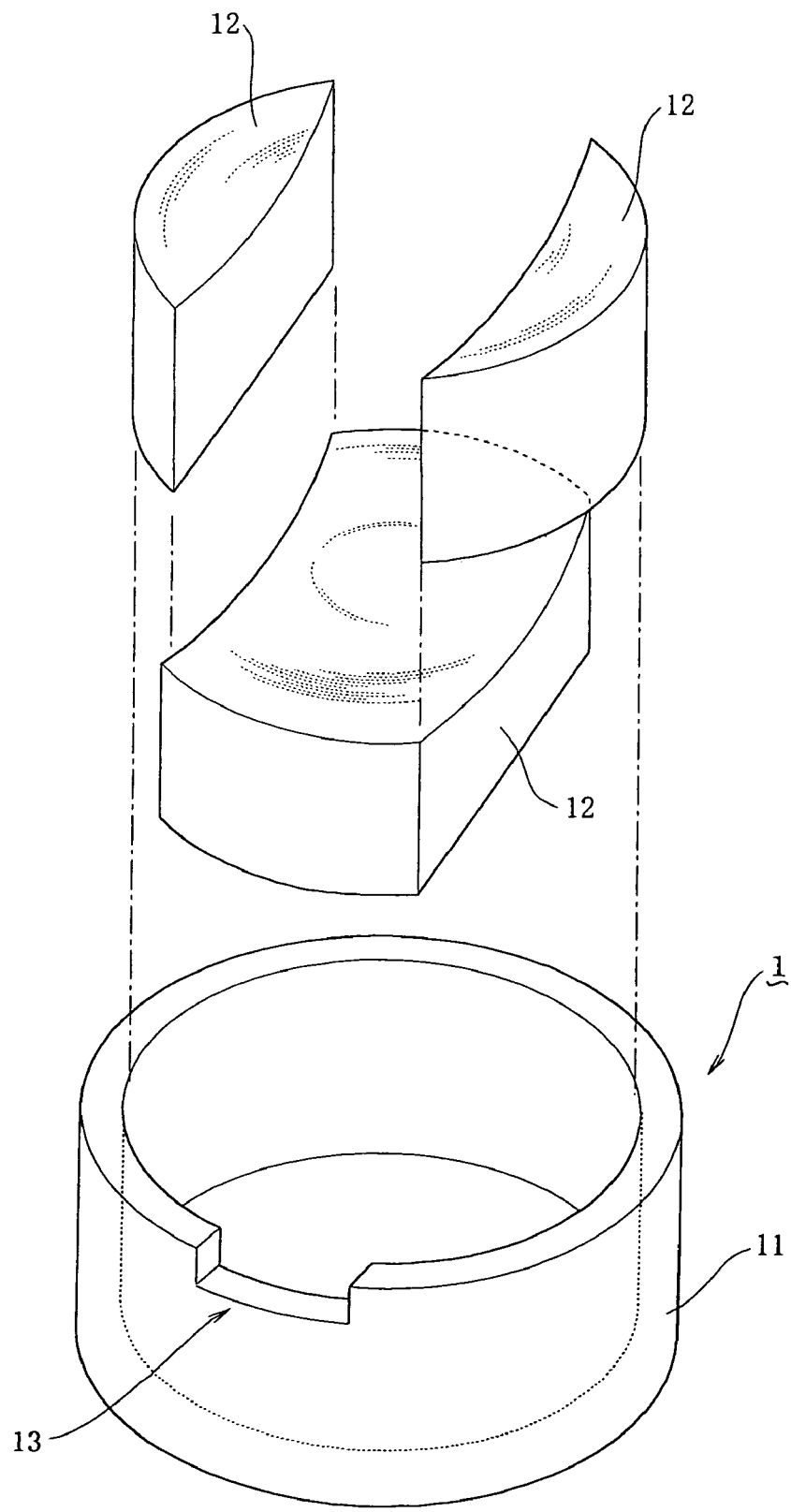
FIG. 3 is a broken perspective view of the split casting die adopted for the first embodiment.

The first embodiment of the present invention is described on the basis of FIG. 1 through FIG. 10. As shown in FIG. 1 through FIG. 3, a casting die adopted herein and indicated with numeral 1 in the drawings is arranged such that a plurality of mobile portions 12.12 . . . are telescopically received in a casing 11 and a gate 13 through which a fused lens molding resin M is injected into a cavity of the die 1 is formed at an upper fringe portion of the casing 11 and the upper surfaces of the respective mobile portions 12.12 . . . are engaged in alignment so as to form a molding surface 10 with a curvature. To note, the formation position of the gate 13 on the casing 11 may be changed where appropriate.

Figure 4:
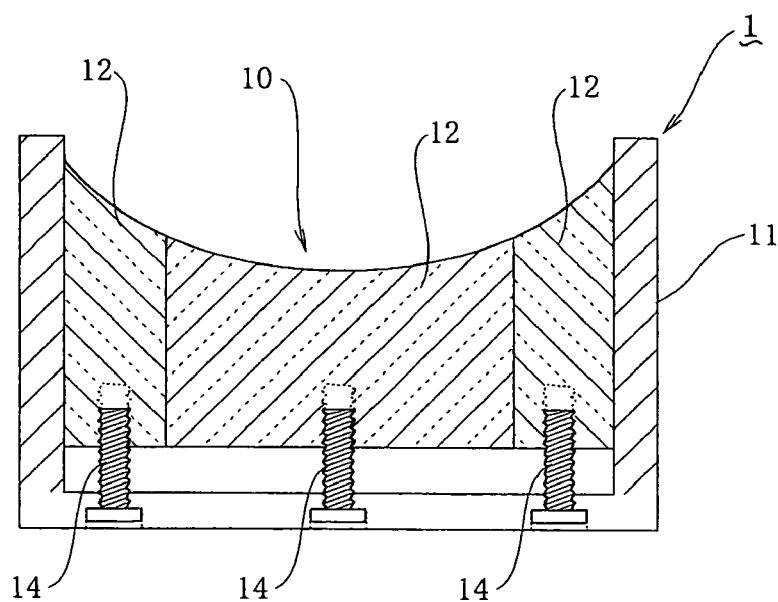
FIG. 4 is a sectional view of the split casting die adopted for the first embodiment.

Further, ascending or descending at least one of the mobile portions 12 generates a stepped portion at a boundary between adjacent mobile portions so as to generate a recess H at one of the mobile portion 12 as descended. In the present embodiment, an adjusting bolt 14 is screwed into each of the mobile portions 12 from the bottom side of the die 1, which bolt is turned so as to ascend or descend at least one of the mobile portions 12 and adjust a depth of the recess H as shown in FIG. 4.

Figure 5:
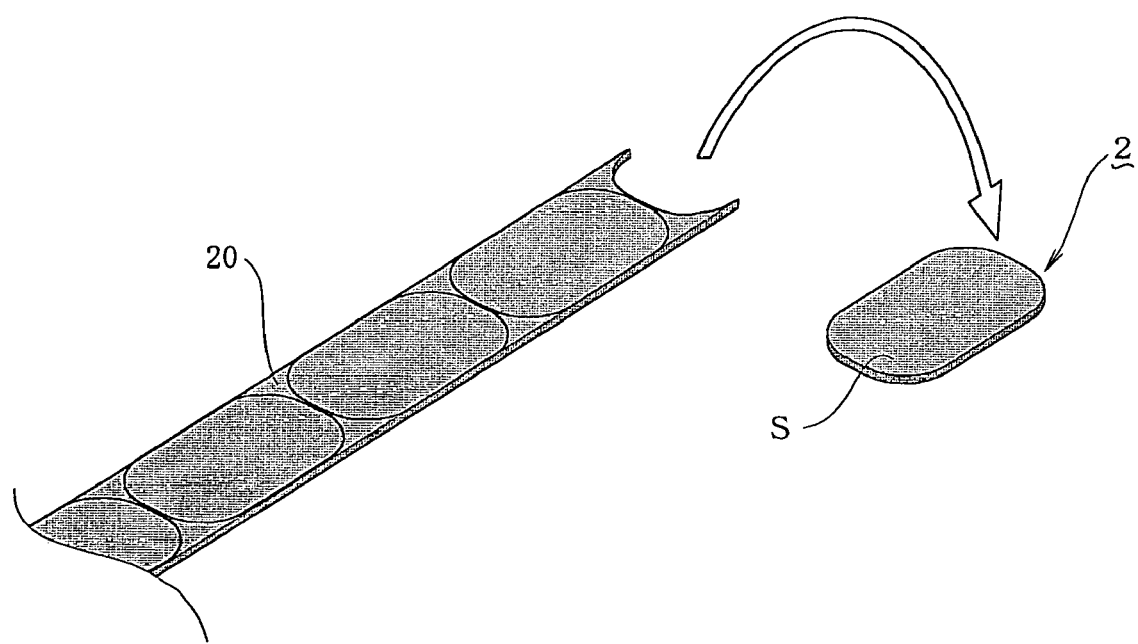
FIG. 5 is a perspective view to show the production step of a polarized film adopted for the first embodiment.

Reference numeral 2 in the drawings is a polarized film, which film is formed by carving out a shape substantially corresponding to that of the recess H from a polarized film original sheet 20, as shown in FIG. 5. The material for the polarized film includes among others such a polyvinyl alcohol resin based film, a polyvinyl acetal resin based film and a polyvinyl butyral resin based film as generally used, which film is colored with a dichroism dye possessed of heat and moisture resistance and is subjected to either a uniaxial or biaxial stretching operation for production.

Then, a cellulose triacetate resin film of optically excellent transparency is attached through an adhesive on the respective side surfaces of the polarized film 2, the thickness, the all spectrum transmittance and the degree of polarization of which film are in the order of 0.2 mm, at 40% or above and 90% or above respectively in the present embodiment. Making the thickness of the film 0.2 mm facilitates maintaining the all spectrum transmittance at 40% or above and decreases the production cost of the film.

Then, an adhesive S is applied on the surface of the polarized film 2 so as to form an adhesive layer 21, for which adhesive a two-component adhesive is adopted, which comprises a polyol (polyhydric alcohol) essentially consisting of polyester urethane resin or polyether urethane resin having the average molecular weight ranging from and including 10,000 through 200,000, which polyol is compounded with polyisocyanate acting as a cross-linking agent.

The application method of the adhesive includes such gravure coating and offset coating as conventionally used. Upon the application thereof, due care should be taken so that the thickness of the adhesive layer 21 ranges from 0.5 μm through 80 μm. In this regard, the bonding of the adhesive as applied to the surface of the film becomes weaker with the thickness of less than 0.4 μm and there are some cases where the adhesive S oozes out from the rim edge surface of the lens with the thickness of more than 100 μm.

Figure 6:
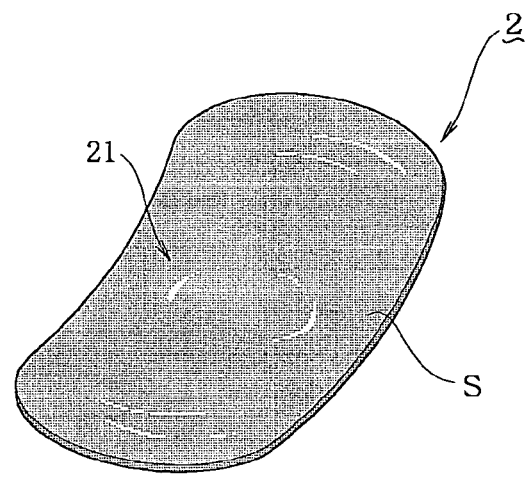
FIG. 6 is a perspective view of a polarized film adopted for the first embodiment.

Then, the polarized film 2 is hot-pressed for one minute and thirty seconds under the temperature of 100 degrees Centigrade and molded into a curved shape adaptable into the curvature of the mobile portion as recessed, as shown in FIG. 6. The polarized film as obtained is disposed in the split casting die 1, into which die the lens molding resin M (acrylic resin having the glass transition temperature ranging from 50 degrees to 70 degrees Centigrade) is injected.

Figure 7:
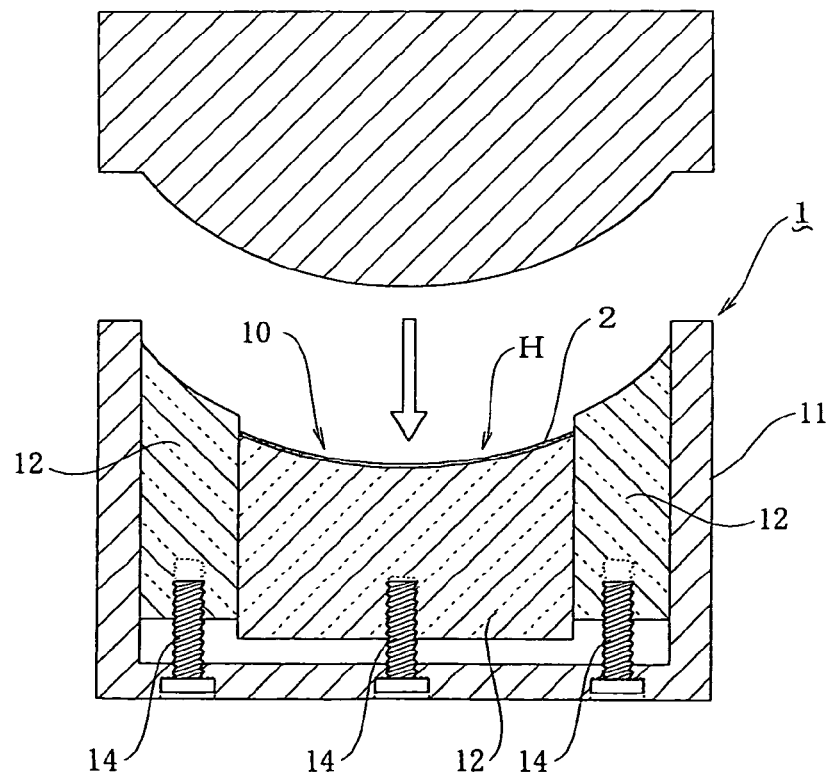
FIG. 7 is a sectional view of the split casting die to show the production step according to the first embodiment.

Herein, the recess H is formed with the boundary between adjacent mobile portions 12 running linear. The fringe portion of the polarized film 2 is held on to the stepped portion generated along the boundary, which film is mounted into the bottom of the recess H with the adhesive layer 21 facing upwards, as shown in FIG. 7. Then, the casting die 1 is closed.

Figure 8:
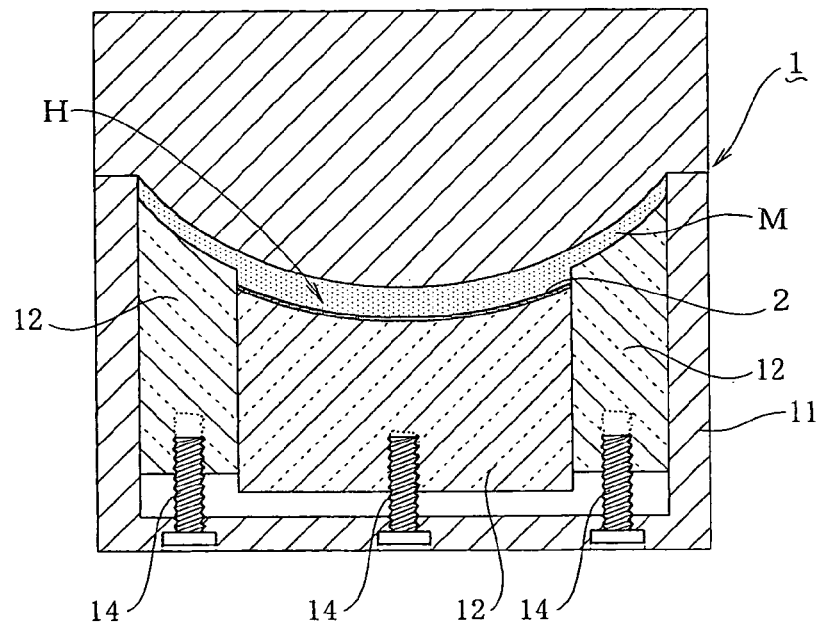
FIG. 8 is a sectional view of the split casting die to show the production step according to the first embodiment.
Figure 9:
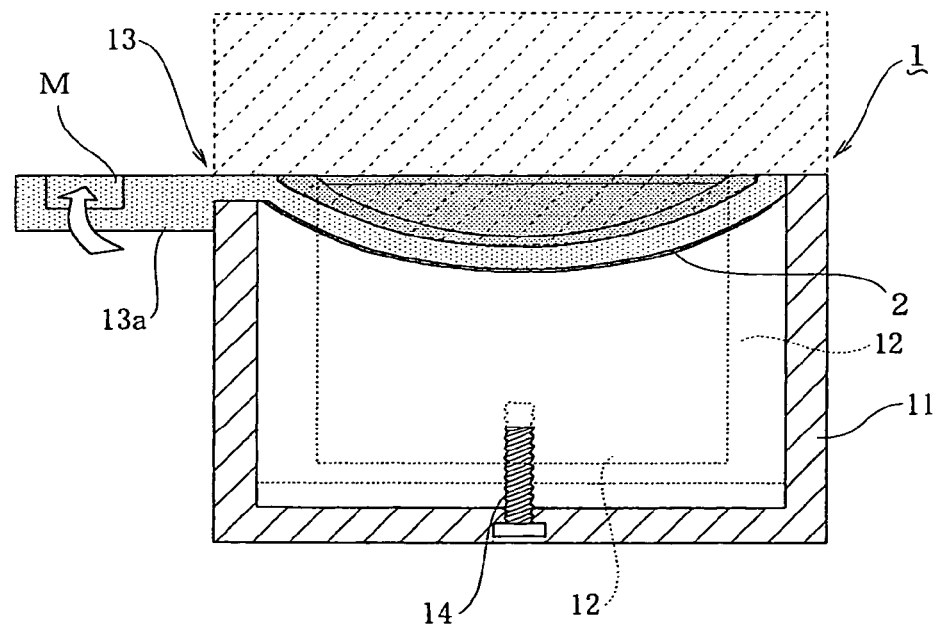
FIG. 9 is a side view of the split casting die to show the production step according to the first embodiment.

Then, a fused molding resin M such as acrylic resin, acrylic based copolymer resin, polyamide resin, polyurethane resin, polyethylene terephthalate resin and polycarbonate resin is injected through the gate 13 into the cavity of the casting die 1 with the same resin filled in the runner 13*a* engaged to the casting die 1, as shown in FIG. 8 and FIG. 9.

At this time, the differentiation of the direction to which the fused molding resin M is filled in the runner 13*a* engaged to the casting die 1 from that to which the resin M is injected into the cavity of the die through the gate 13 allows the injection pressure of the molding resin M applied to the cavity to be abated. This minimizes such bad effect on the polarized film 2 as brought by heat generated and resin flow occurring during the filling of the molding resin M into the cavity of the casting die 1, which prevents the adhesive layer 21 from being peeled off and the polarized axis of the lens from being displaced from a given position, with the result that the stable production of a polarized lens of uniform density and hard to be distorted is secured.

Figure 10:
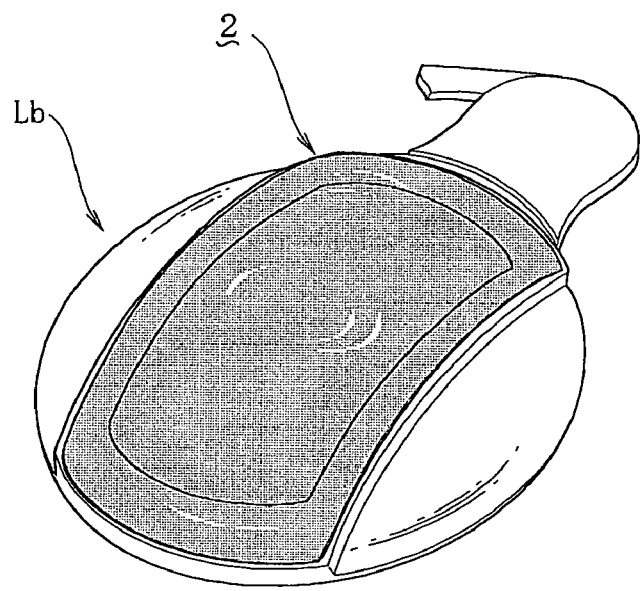
FIG. 10 is a perspective view of a lens prototype according to the first embodiment.

Then, upon the curing of the molding resin M as filled in the cavity, the polarized film 2 is integrally jointed to the convex side surface of a lens prototype Lb as shown in FIG. 10, which prototype is taken out and blanked out into a shape as required.

At this time, further, a hard coating operation may be performed on the surface of the lens prototype Lb, which operation comprises the steps of coating the surface with a primer structure layer made from acrylic resin or polyurethane resin intended for improving adhesiveness and water-resistance and coating the primer structure layer with a silicone resin based thermosetting hardening liquid or an acrylic or epoxy resin based heat radiation hardening liquid.

Furthermore, in this embodiment, where appropriate, the lens molding resin M may be mixed with photochromic material so as to be provided with photochromism functionality, for which photochromic material a spirooxazine based pigment is optimum and a naphthopyran based pigment, a furan based pigment, a spiropyran based pigment, a fulgide based pigment and a chromene based pigment are also adoptable. In order to provide the photochromism functionality with the lens molding resin M, such admixture method as hand-blending processing, master batch processing by extrusion molding or knead-mixing processing is desirable in light of the facility to control the quantity to be added.

(Second Embodiment)

Figure 11:
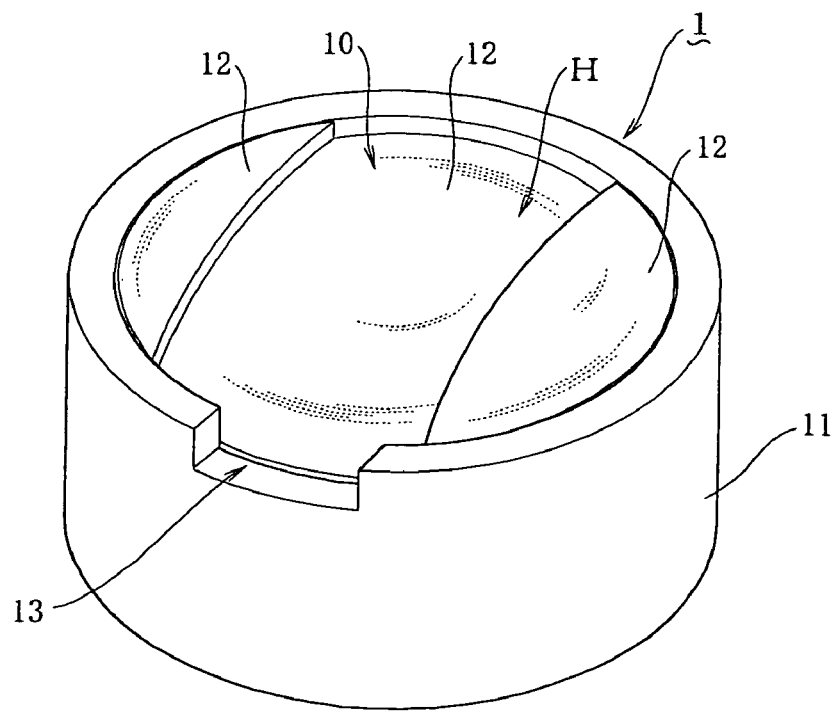
FIG. 11 is a perspective view of a split casting die adopted for the second embodiment.
Figure 12:
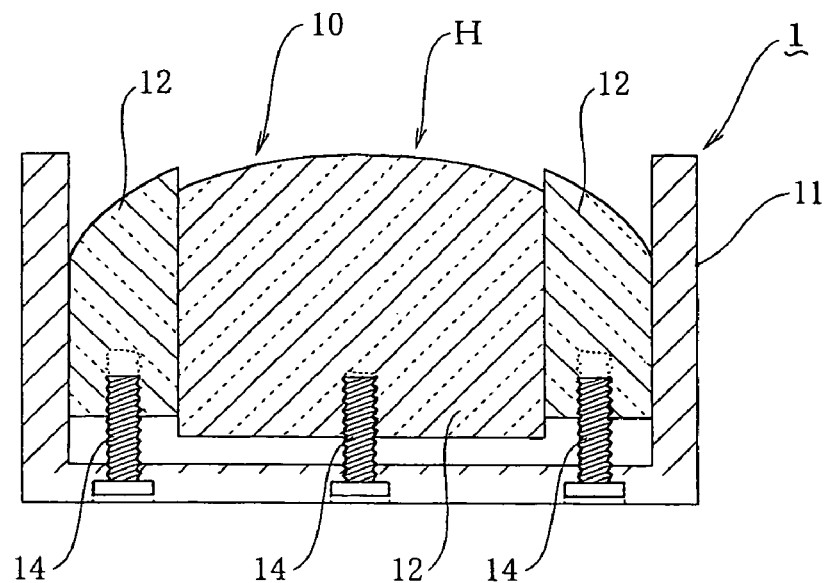
FIG. 12 is a sectional view of the split casting die adopted for the second embodiment.

The production method according to the instant embodiment is described with reference to FIG. 11 and FIG. 12. The molding surface 10 of the split casting die 1 has a curvature convexly curved upwards. The arrangement that any one of the mobile portions 12 is descended relatively to the other mobile portions so as to make a stepped portion at the boundary between adjacent mobile portions and form a recess H at one of the mobile portions 12 as descended is the same as the first embodiment.

Then, the polarized film 2 is hot-pressed so as to correspond to the curvature of the mobile portion as recessed and mounted into the bottom of the recess H with the adhesive layer 21 facing upwards.

Upon the curing of the lens molding resin as filled in the cavity of the die, the polarized film 2 is integrally jointed to the concave side surface of the lens prototype Lb, which prototype lens is taken out and blanked out into a shape as required.

Figure 13:
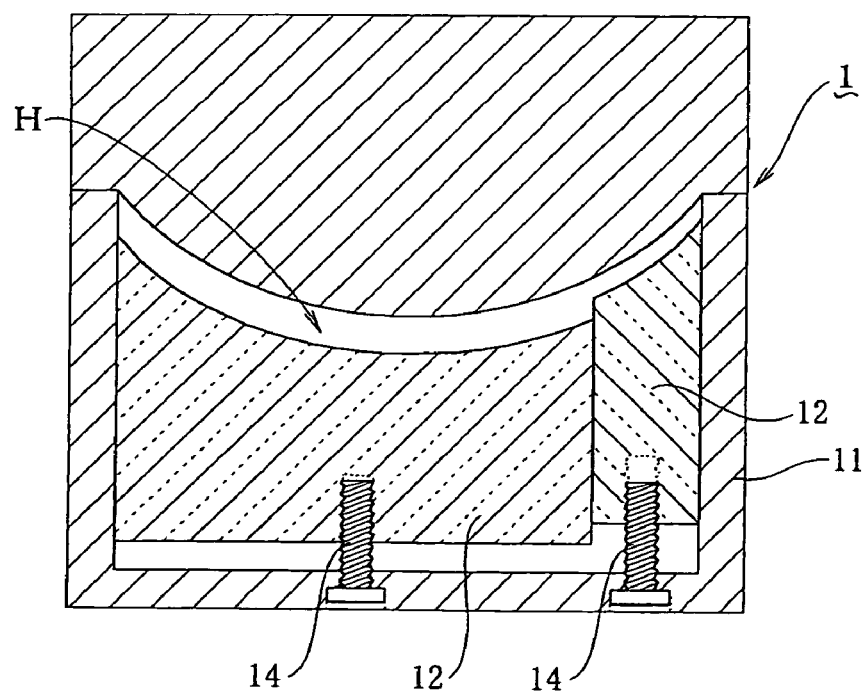
FIG. 13 is a sectional view of a split casting die adopted for a modified example of the present invention.

Although the invention is substantially described above with its preferred modes of carrying out the same, it should be understood that the invention is not limited to the embodiments as disclosed herein, but may be modified into various manners within the scope of the accompanying patent claims. For instance, the split shape and the number of the mobile portions 12 of the die 1 may be modified such that they consist of two pieces as shown in FIG. 13 so as to be able to correspond to the definitive design of a lens product, which modification belongs to the technical scope of the invention.

INDUSTRIAL APPLICABILITY

As described above, the adoption of the split casting die according to the invention allows a stepped portion adjustable in depth to be formed at the boundary between adjacent mobile portions, to which stepped portion the polarized film is held on in a secure manner, and allows the use of the polarized film required for the production of a polarized lens to be minimized so as to improve the yielding ratio of the lens production, which leads to the reduction of the production cost.

The injection of the fused lens molding resin into the cavity of the casting die 1 through the gate with the resin filled in the runner engaged to the die prevents the polarized film from being distorted or displaced from a given position by heat and resin flow so as to securely the polarized film within the die. The polarized lens according to the invention is epoch-making because the lens prototype is molded in a uniform density and almost free from distortion on the lens surface, the production method of which lens according to the invention is also economical and efficient, so that the industrial applicability of the invention is very high.

The invention claimed is:

1. Method of producing a polarized lens by using a split casting die arranged such that at least one of a plurality of mobile portions splitting a molding surface that forms a curvature of said lens, into which surface a polarized film is mounted, makes one of ascending and descending movement from the molding surface so as to generate a recess at the molding surface, which method comprises the steps of hot-pressing a polarized film, which is formed into a shape substantially corresponding to one of said plurality of mobile portions, into a curved shape adaptable into said curvature; descending said one of said plurality of mobile portions so as to generate said recess thereat; mounting said polarized film as shaped with said curvature into said recess and closing said casting die; injecting a fused lens molding resin into a cavity within said casting die from a gate with said lens molding resin filled in a runner engaged to said casting die; and taking out a prototype lens, in which said lens molding resin is integrally joined with said polarized film, when said molding resin is cured.

2. Method of producing a polarized lens according to claim 1 further comprising the step of applying a transparent adhesive on said polarized film as mounted into said recess.

3. Method of producing a polarized lens according to claim 1 further comprising the steps of substantially linearly forming a boundary between said adjacent mobile portions of said casting die so as to define said recess at the molding surface and holding a fringe portion of said polarized film on to a stepped portion generated along said boundary.

4. Method of producing a polarized lens according to claim 1 further comprising the step of performing a hard coating operation on a surface of said lens prototype.

5. Method of producing a polarized lens according to claim 1 further comprising the steps of screwing an adjusting bolt into said respective mobile portions from a bottom side of said casting die and turning said bolt so as to make one of ascending and descending movement of said respective mobile portions and make a depth of said recess adjustable.

6. Method of producing a polarized lens according to claim 1 further comprising the step of mixing said lens molding resin with a photochromic material so as to be provided with photochromism functionality.

7. Method of producing a polarized lens according to claim 1 further comprising the step of differentiating a first direction to which said lens molding resin is filled in said runner engaged to said casting die from a second direction to which said lens molding resin is injected into said cavity within said casting die through the gate so as to abate an injection pressure of said lens molding resin into said cavity.

8. Method of producing a polarized lens according to claim 1 further comprising the step of making a thickness of a polarized film original sheet in the order of 0.2 mm.

9. Method of producing a polarized lens according to claim 2 further comprising the steps of substantially linearly forming a boundary between said adjacent mobile portions of said casting die so as to define said recess at the molding surface and holding a fringe portion of said polarized film on to a stepped portion generated along said boundary.

10. Method of producing a polarized lens according to claim 2 further comprising the step of performing a hard coating operation on a surface of said lens prototype.

11. Method of producing a polarized lens according to claim 3 further comprising the step of performing a hard coating operation on a surface of said lens prototype.

12. Method of producing a polarized lens according to claim 2 further comprising the steps of screwing an adjusting bolt into said respective mobile portions from a bottom side of said casting die and turning said bolt so as to make one of ascending and descending movement of said respective mobile portions and make a depth of said recess adjustable.

13. Method of producing a polarized lens according to claim 3 further comprising the steps of screwing an adjusting bolt into said respective mobile portions from a bottom side of said casting die and turning said bolt so as to make one of ascending and descending movement of said respective mobile portions and make a depth of said recess adjustable.

14. Method of producing a polarized lens according to claim 4 further comprising the steps of screwing an adjusting bolt into said respective mobile portions from a bottom side of said casting die and turning said bolt so as to make one of ascending and descending movement of said respective mobile portions and make a depth of said recess adjustable.

15. Method of producing a polarized lens according to claim 2 further comprising the step of mixing said lens molding resin with a photochromic material so as to be provided with photochromism functionality.

16. Method of producing a polarized lens according to claim 3 further comprising the step of mixing said lens molding resin with a photochromic material so as to be provided with photochromism functionality.

17. Method of producing a polarized lens according to claim 4 further comprising the step of mixing said lens molding resin with a photochromic material so as to be provided with photochromism functionality.

18. Method of producing a polarized lens according to claim 5 further comprising the step of mixing said lens molding resin with a photochromic material so as to be provided with photochromism functionality.

19. Method of producing a polarized lens according to claim 2 further comprising the step of differentiating a first direction to which said lens molding resin is filled in said runner engaged to said casting die from a second direction to which said lens molding resin is injected into said cavity within said casting die through the gate so as to abate an injection pressure of said lens molding resin into said cavity.

20. Method of producing a polarized lens according to claim 3 further comprising the step of differentiating a first direction to which said lens molding resin is filled in said runner engaged to said casting die from a second direction to which said lens molding resin is injected into said cavity within said casting die through the gate so as to abate an injection pressure of said lens molding resin into said cavity.

21. Method of producing a polarized lens according to claim 4 further comprising the step of differentiating a first direction to which said lens molding resin is filled in said runner engaged to said casting die from a second direction to which said lens molding resin is injected into said cavity within said casting die through the gate so as to abate an injection pressure of said lens molding resin into said cavity.

22. Method of producing a polarized lens according to claim 5 further comprising the step of differentiating a first direction to which said lens molding resin is filled in said runner engaged to said casting die from a second direction to which said lens molding resin is injected into said cavity within said casting die through the gate so as to abate an injection pressure of said lens molding resin into said cavity.

23. Method of producing a polarized lens according to claim 6 further comprising the step of differentiating a first direction to which said lens molding resin is filled in said runner engaged to said casting die from a second direction to which said lens molding resin is injected into said cavity within said casting die through the gate so as to abate an injection pressure of said lens molding resin into said cavity.

24. Method of producing a polarized lens according to claim 2 further comprising the step of making a thickness of a polarized film original sheet in the order of 0.2 mm.

25. Method of producing a polarized lens according to claim 3 further comprising the step of making a thickness of a polarized film original sheet in the order of 0.2 mm.

26. Method of producing a polarized lens according to claim 4 further comprising the step of making a thickness of a polarized film original sheet in the order of 0.2 mm.

27. Method of producing a polarized lens according to claim 5 further comprising the step of making a thickness of a polarized film original sheet in the order of 0.2 mm.

28. Method of producing a polarized lens according to claim 6 further comprising the step of making a thickness of a polarized film original sheet in the order of 0.2 mm.

29. Method of producing a polarized lens according to claim 7 further comprising the step of making a thickness of a polarized film original sheet in the order of 0.2 mm.

* * * * *